(12) United States Patent
Lorenz

(10) Patent No.: US 6,779,736 B1
(45) Date of Patent: Aug. 24, 2004

(54) THERMOSTAT WITH DIGITAL AND RESISTOR CONTROL OF TRIP POINT

(75) Inventor: Perry Scott Lorenz, Fort Collins, CO (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 10/618,151

(22) Filed: Jul. 11, 2003

(51) Int. Cl.[7] .............................................. G05D 23/00
(52) U.S. Cl. ..................... 236/91 G; 236/94; 361/93.8; 361/103; 338/25
(58) Field of Search ........................... 236/91 G, 91 D, 236/94; 361/103, 93.8; 307/116, 117; 338/25

(56) References Cited

U.S. PATENT DOCUMENTS

| | | | | |
|---|---|---|---|---|
| 3,644,864 A | * | 2/1972 | Hirsbrunner et al. | 338/25 |
| 3,673,538 A | * | 6/1972 | Faxon | 338/25 |
| 4,060,123 A | * | 11/1977 | Hoffman et al. | 165/11.1 |
| 4,616,485 A | * | 10/1986 | Gillett et al. | 62/228.1 |
| 5,196,833 A | * | 3/1993 | Kemp | 340/663 |
| 6,342,997 B1 | * | 1/2002 | Khadkikar et al. | 361/103 |

* cited by examiner

*Primary Examiner*—Marc Norman
(74) *Attorney, Agent, or Firm*—Merchant & Gould P.C.; Timothy P. Sullivan

(57) ABSTRACT

The present invention is directed at using digital inputs in addition to an external resistor to set the trip point for a thermostat. The digital inputs are used to select a voltage (temperature) range. The value of the external resistor is used to select the specific trip point within the selected range. Since the voltage drop across the resistor is smaller than prior art methods, the tolerance of the resistor is also smaller in terms of voltage or temperature. This results in the trip point for the chip having a tighter tolerance. According to different embodiments, the digital inputs may be actively controlled or hardwired.

20 Claims, 3 Drawing Sheets

THERMOSTAT WITH DIGITAL AND RESISTOR CONTROL OF TRIP POINT

FIELD OF THE INVENTION

The present invention relates to electronic circuits, and more specifically to setting a trip point.

BACKGROUND OF THE INVENTION

Temperature is an often-measured environmental quantity. This might be expected since most physical, electronic, chemical, mechanical and biological systems are affected by temperature. Some processes work well only within a narrow range of temperatures; certain chemical reactions, biological processes, and even electronic circuits perform best within limited temperature ranges. When these processes need to be optimized, control systems that keep temperature within specified limits are often used. Temperature sensors provide inputs to those control systems.

Many electronic components can be damaged by exposure to high temperatures, and some can be damaged by exposure to low temperatures. Semiconductor devices and LCDs (Liquid Crystal Displays) are examples of commonly used components that can be damage by temperature extremes. When temperature limits are exceeded, action must be taken to protect the system. In these systems, temperature sensing helps enhance reliability. One example of such a system is a personal computer. The computer's motherboard and hard disk drive generate a great deal of heat. The internal fan helps cool the system, but if the fan fails, or if airflow is blocked, system components could be permanently damaged. By sensing the temperature inside the computer's case, high-temperature conditions can be detected and actions can be taken to reduce system temperature, or even shut the system down to avert catastrophe.

Many systems set a temperature trip point that is used to trigger the system that a predetermined temperature has been exceeded. An external resistor is typically used to set the temperature trip point. The external resistor controls the chip's temperature trip point. By selecting the appropriate value of resistor, the customer may set the trip point for the chip.

This solution, however, is not very accurate. Resistor tolerance and the resistor's temperature coefficient add to the trip point tolerance. One problem is that the temperature coefficient is not only in one direction but is plus-or-minus some value. Using common and inexpensive resistors, such as 1% resistors with a +/−100 ppM TC (Temperature Coefficient) can contribute up to 70% of the trip point tolerance.

What is needed is a way to tighten the trip point tolerance.

DETAILED DESCRIPTION OF THE PREFERRED EMBODIMENTS

Figure 1:
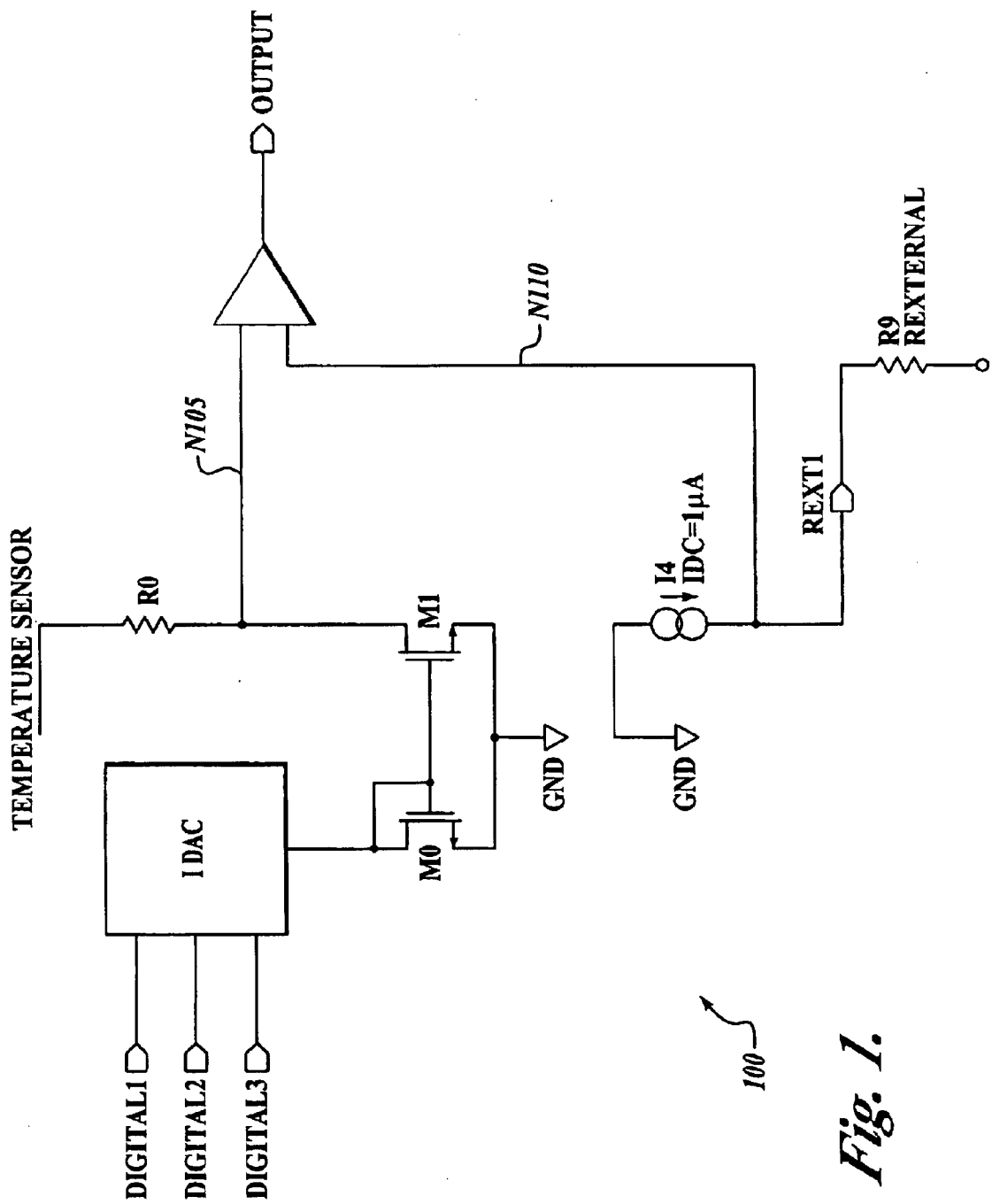
FIG. 1 illustrates a diagram of a trip point circuit using a DAC (Digital to Analog Converter)

In the following detailed description of exemplary embodiments of the invention, reference is made to the accompanied drawings, which form a part hereof, and which is shown by way of illustration, specific exemplary embodiments of which the invention may be practiced. These embodiments are described in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined only by the appended claims.

Throughout the specification and claims, the following terms take the meanings explicitly associated herein, unless the context clearly dictates otherwise. The meaning of "a," "an," and "the" includes plural reference, the meaning of "in" includes "in" and "on." The term "connected" means a direct electrical connection between the items connected, without any intermediate devices. The term "coupled" means either a direct electrical connection between the items connected or an indirect connection through one or more passive or active intermediary devices. The term "circuit" means either a single component or a multiplicity of components, either active and/or passive, that are coupled together to provide a desired function. The term "signal" means at least one current, voltage, or data signal. Referring to the drawings, like numbers indicate like parts throughout the views.

The terms "comprising," "including," "containing," "having," and "characterized by," mean an open-ended or inclusive transitional construct and does not exclude additional, unrecited elements, or method steps. For example, a combination that comprises A and B elements, also reads on a combination of A, B, and C elements.

The present invention is directed at narrowing a temperature range using digital inputs in addition to an external resistor to set the trip point. The digital inputs are used to select a voltage range that corresponds to a temperature range. The value of the external resistor is used to select the specific trip point within the selected range. Since the voltage drop across the resistor is smaller than prior art methods that include the entire temperature range, the tolerance of the resistor is also smaller in terms of voltage or temperature. This results in the trip point for the chip to have a tighter tolerance. According to different embodiments, the digital inputs may be actively controlled or hardwired.

FIG. 1 illustrates a diagram of a trip point circuit using a DAC; in accordance with aspects of the invention. As illustrated in the figure, trip point circuit 100 includes three digital inputs (digital1, digital2, and digital3); current digital to analog converter (I DAC); transistors M0 and M1; resistor R0, current source I4, comparator 110 and external resistor (Rexternal).

The operation of FIG. 1 will now be described. The three digital inputs illustrated are used to narrow the temperature range down to one eighth of the full temperature range. While three digital inputs are shown, more or less digital inputs may be used to expand or narrow the temperature range. For example, four digital inputs would narrow the temperature range to one sixteenth of the full range, while two digital inputs would only narrow the range to one-fourth the full range. The embodiment illustrated uses three additional pins and fits in an eight pin package.

The external resistor (Rexternal) is used to set the trip point within the narrowed temperature range. The voltage drop across the external resistor is smaller across the narrowed temperature range as compared to the voltage drop across the external resistor over the entire temperature range. As a result, the tolerance and temperature coefficient of the external resistor contributes a significantly lower tolerance to the trip point accuracy. This technique can be used to significantly improve semiconductor thermostat accuracy.

As discussed above, the three digital inputs (digital1, digital2, and digital3) select one of eight voltage (temperature) ranges. Assuming each range covers 23° C. then the entire temperature range would span about 184 degrees. For example, the entire range could span between −40° C. and +145° C. The value of the external resistor is selected to trip at a specific temperature. The voltage drop across the external resistor to cover a 23° C. range is much smaller than across the 184° C. range. The tolerance of the resistor, therefore, is also smaller in terms of voltage or temperature.

The current DAC is configured to generate a signal corresponding to the state of the digital inputs. As illustrated, the DAC generates one of eight corresponding currents depending on the state of the three digital inputs. Comparator 110 determines when the trip point is tripped based on the signal at node N105 and the signal at node N110.

The digital inputs to the DAC may be hardwired or under active control. When the digital inputs are under active control, the tripping of eight trip points could be monitored thereby enabling the measurement of the current temperature associated with the circuit. For example, the circuit could select the first range out of the eight ranges, and when the circuit trips at the first range, the circuit could select the second range and wait for it to trip. In this way, temperature information relating to the circuit can be obtained. This also allows the customer to test the system's response to an over temperature condition even though the system is at room temperature.

Figure 2:
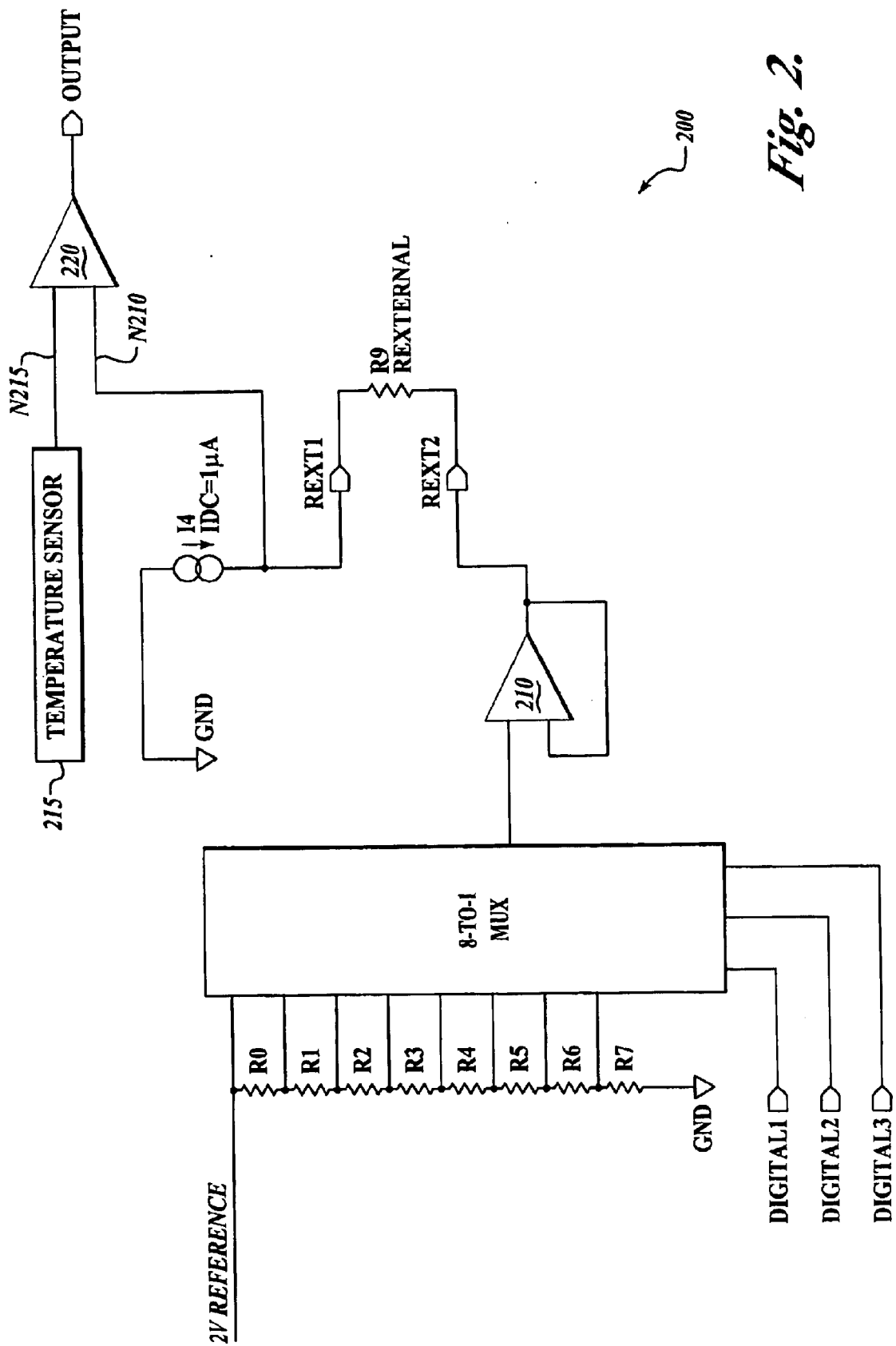
FIG. 2 shows a diagram of a trip point circuit using a MUX (Multiplexer)

FIG. 2 shows a diagram of a trip point circuit using a MUX; in accordance with aspects of the invention. As illustrated in the figure, trip point circuit 200 includes resistors (R0–R7) and external resistor (Rexternal); a multiplexor (8-to-1 MUX); buffer 210; temperature sensor 215; current source 14, and comparator 220.

The operation of FIG. 2 will now be described. The operation of the circuit illustrated in FIG. 2 is similar to the operation described in FIG. 1.

Digital inputs (digital1, digital2, and digital3) are used to select one of eight temperature ranges. Each selected temperature range is one eighth of the entire temperature range. In response to the state of the digital inputs, the 8-to-1 MUX selects the one of eight temperature ranges and outputs a signal-representing the selected range. A voltage is established and the comparator is used to determine when the trip point trips in response to the signals at node N210 and node N215. As discussed above, the value of the external resistor is set such that the circuit trips at the desired temperature.

According to different embodiments, more or less than three digital inputs may be used to obtain different narrowed temperature ranges. As discussed above, the digital inputs may be hardwired or under active control. When the digital inputs are under active control, the tripping of trip points using the different ranges could be monitored thereby enabling the measurement of the current temperature.

Figure 3:
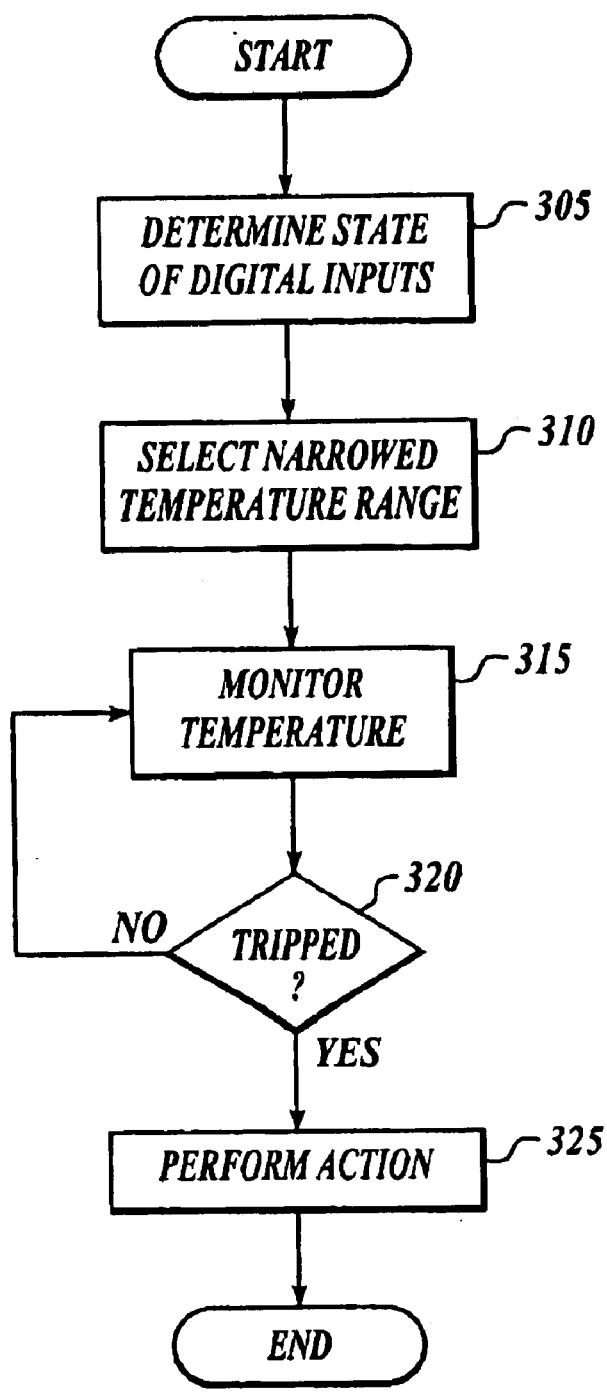
FIG. 3 illustrates a process for setting a trip point, in accordance with aspects of the invention.

FIG. 3 illustrates a process for setting a trip point, in accordance with aspects of the invention.

After a start block, the process moves to block 305, where the state of the digital inputs is determined. The digital inputs determine the narrowed temperature range to select to use as the trip point. According to one embodiment, three digital inputs are used allowing one of eight temperature ranges to be selected.

Moving to block 310, the process selects the narrowed temperature range based on the digital inputs. Flowing to block 315, the temperature is monitored. Transitioning to decision block 320 a determination is made as to whether the trip point has been tripped. When tripped, the process flows to block 325 where a predetermined action occurs. The predetermined action may be many different actions. For example, a fan may come on to help cool the circuit, the circuit may be shut down, the circuit may go into a low-power mode, and the like. When the circuit has not tripped, the process returns to block 315. The process then moves to an end block and returns to processing other actions.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. An apparatus for controlling a trip point; comprising:
   at least one digital input configured to select a narrowed temperature range that is a portion of an entire temperature range;
   a DAC configured to receive the at least one digital input, and in response, output a signal relating to the selected narrowed temperature range;
   an external resistor configured to set the trip point; and
   a comparator coupled to the external resistor and the DAC and configured to determine when the trip point has been tripped.

2. The apparatus of claim 1, wherein the at least one digital input is under active control.

3. The apparatus of claim 1, wherein the at least one digital input is hardwired.

4. The apparatus of claim 1, further comprising a temperature sensor arranged to measure temperature and coupled to the comparator.

5. The apparatus of claim 4, wherein the DAC is configured to generate a current in response to the at least one digital input.

6. The apparatus of claim 5, wherein the entire temperature range spans about 180 degrees Celsius.

7. The apparatus of claim 5, wherein the narrowed temperature range covers about 23 degrees Celsius.

8. An apparatus for controlling a trip point, comprising:
   at least one digital input configured to select a narrowed temperature range that is a portion of an entire temperature range;
   a multiplexer (MUX) configured to receive the at least one digital input, and in response output a signal relating to the narrowed temperature range;
   an external resistor configured to set the trip point; and
   a comparator coupled to the external resistor and the MUX and configured to determine when the trip point has been tripped.

9. The apparatus of claim 8, wherein the at least one digital input is under active control.

10. The apparatus of claim 9, further comprising a temperature sensor arranged to measure temperature and coupled to the comparator.

11. The apparatus of claim 10, wherein the entire temperature range spans about 180 degrees Celsius.

12. The apparatus of claim 11, wherein the narrowed temperature range covers about 23 degrees Celsius.

13. The apparatus of claim 8, wherein the at least one digital input is hardwired.

14. A method for controlling a trip point for a circuit, comprising:

determining a state of at least one digital input;

selecting a narrowed temperature range that is a portion of an entire temperature range from the state of the at least one digital input;

setting the trip point;

monitoring a temperature associated with the circuit; and determining when the trip point is tripped.

15. The method of claim 14, further comprising performing a predetermined action when the trip point is tripped.

16. The method of claim 14, wherein setting the trip point further comprises using an external resistor.

17. The method of claim 16, further comprising actively controlling the at least one digital input.

18. The method of claim 14, further comprising testing a response of the circuit to an over temperature condition when the circuit is at a temperature below the over temperature condition.

19. An apparatus for controlling a trip point, comprising:

means for determining a state of at least one digital input;

means for selecting a narrowed temperature range that is a portion of an entire temperature range;

means for setting the trip point;

means for monitoring a temperature associated with the circuit; and means for determining when the trip point is tripped.

20. The method of claim 19, further comprising means for performing a predetermined action when the trip point is tripped.

* * * * *

UNITED STATES PATENT AND TRADEMARK OFFICE
CERTIFICATE OF CORRECTION

PATENT NO. : 6,779,736 B1 Page 1 of 1
DATED : August 24, 2004
INVENTOR(S) : Perry Scott Lorenz It is certified that error appears in the above-identified patent and that said Letters Patent is hereby corrected as shown below:

Column 3,
Line 41, please change "14" to -- I4 --.

Signed and Sealed this

First Day of February, 2005

JON W. DUDAS
*Director of the United States Patent and Trademark Office*